C. A. AND H. M. GRANZOW.
POWER TRANSMISSION MECHANISM.
APPLICATION FILED JAN. 10, 1918.

1,338,767. Patented May 4, 1920.
4 SHEETS—SHEET 4.

Inventors
Carl A. Granzow,
Henry M. Granzow,

Attorneys

UNITED STATES PATENT OFFICE.

CARL A. GRANZOW AND HENRY M. GRANZOW, OF DAYTON, OHIO.

POWER-TRANSMISSION MECHANISM.

1,338,767.  Specification of Letters Patent.  Patented May 4, 1920.

Application filed January 10, 1918. Serial No. 211,275.

*To all whom it may concern:*

Be it known that we, CARL A. GRANZOW and HENRY M. GRANZOW, citizens of the United States, residing at Dayton, in the county of Montgomery and State of Ohio, have invented certain new and useful Improvements in Power-Transmission Mechanism, of which the following is a specification, reference being had therein to the accompanying drawing.

This invention relates to power transmission mechanism and has as a principal object the provision of an improved change speed gearing, the construction providing for changing the relative velocity of a driving and a driven shaft without shifting any gears into or out of mesh. The connection of elements of the gearing is such that some of the elements thereof may be partly or wholly restrained from moving whereby to vary the velocity ratio.

A further principal object is to provide a change speed gearing having a very large number of possible velocity ratios between a driving and a driven shaft, the changes being made by variably and partly restraining the movement of some of the parts.

An additional object is to provide such a change speed mechanism especially adapted for use with automobiles, the mechanism having provisions for giving reverse and forward movements of the driven shaft as compared with the driving shaft and of giving many velocity ratios in both forward and reverse movements.

An additional object is to provide a planetary transmission gearing in which some of the elements may be partially or wholly restrained from movement by resistances comprising liquid pumps. These resistances may be varied so as to permit partial movement of the elements controlled thereby without waste of power and by varying the extent of restraint of such elements a large number of velocity ratios may be obtained.

The mechanism shown is adapted to connect a driving shaft, such as the crank shaft of an automobile, to a driven shaft, such as the propeller shaft of the vehicle. The construction includes planetary gearing and provides pumps for liquid, these pumps being connected to certain of the elements of the gearing and having valve controls such that the passage of the liquid through the pumps may be more or less restrained. If the passage of the liquid through any particular pump is entirely restrained the pump is prevented from movement and thereby the part controlled by the pump is also held against movement. If the valve position is such that partial movement of the liquid may be caused by the pumps then a relatively slow movement of the elements controlled by the pumps is obtained and thereby the velocity ratio between the driving and the driven shafts is varied.

In the construction shown the mechanism is adapted to reverse the movement of the propeller shaft relative to the driving shaft or to cause these shafts to turn in the same direction. The latter direction causes a movement of the driven mechanism, whatever it is, which may be called a forward movement and this may be attained in two steps, the first of which may be termed "low gear" and the second "high gear" in accordance with the usage of those terms in connection with automobiles.

Figures 6, 8, 9:
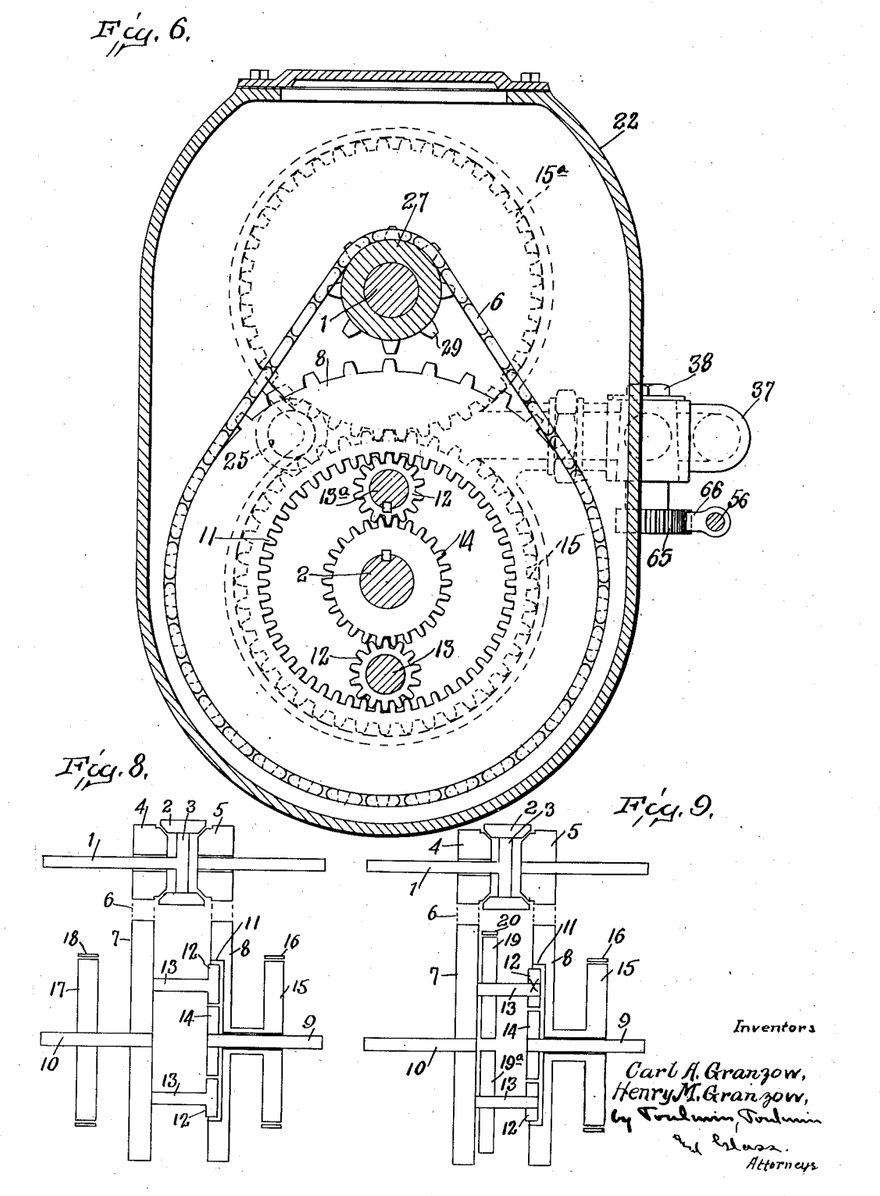
Fig. 6 is a similar section but taken on the line 6—6 of Fig. 4.
Figs. 8 and 9 are simplified explanatory diagrams, Fig. 8 showing the means for causing forward and reverse movements of the driven shaft, and Fig. 9 showing means for providing low and high gear ratios of velocity movement.
Figure 7:
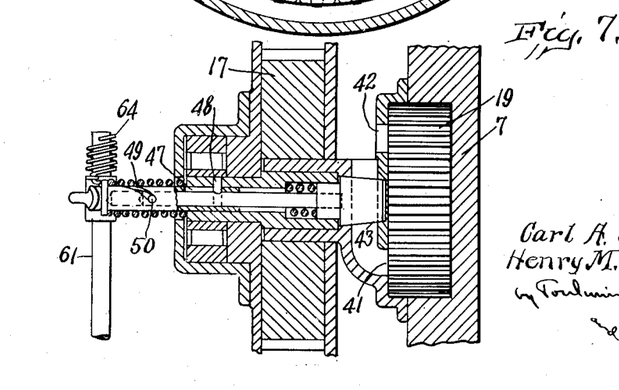
Fig. 7 is a horizontal section taken on the line 7—7 of Fig. 4.

A brief statement of the general mode of operation of the device will be first given referring to Figs. 8 and 9, and then the actual construction of the parts will be described. Fig. 8 shows a diagram of a construction adapted to give forward and reverse movements but here the forward movement has not the low and high gear construction. Fig. 9 on the other hand shows the low and high gear connections for forward movement, but no reversing mechanism is there shown.

Referring first to Fig. 8 the driving shaft 1 has fast thereto a planet gear 2, this gear being carried by a post 3 fast to the driving shaft. Of course, the planet gear 2 may rotate around its axis on the post 3 and the post 3 may be revolved with the shaft 1.

Constantly meshing with planet gear 2 are bevel gears 4 and 5, these being on opposite sides of the planet gear. Bevel gear 4 is loosely carried on driving shaft 1 and bevel gear 5 may be loosely mounted in any desired manner.

Both the bevel gears are connected by chains 6 indicated by the dotted lines of the figure with large central gears numbered respectively 7 and 8. Of these gear 8 is journaled loosely on the driven shaft 9 and gear 7 may be carried by a shaft 10 in any desired manner.

Central gear 8 has internal teeth 11 constantly meshing with intermediate pinions 12 carried on posts 13 projecting from the side of central gear 7. These pinions 12 mesh constantly with a gear 14 fast on the driven shaft 9. Connected with the central gear 8 by a sleeve is a drum 15 which in the diagram is shown as being provided with a brake strap 16. The shaft 10 carrying central gear 7 is shown as provided with a similar brake drum 17 having a brake strap 18. It will be understood that for simplicity the restraining devices have been shown in the diagrams as brake drums and brake straps, but it will be understood that the actual construction disclosed in the other figures of the drawings comprises liquid pumps which may be partly or wholly restrained.

Assuming that the driving shaft 1 of Fig. 8 is being rotated at a constant velocity and that neither of the brake straps 16 or 18 is tightened on the corresponding brake drums it will be seen that the rotation of planet gear 2 will cause rotation in the same direction of both the bevel gears 4 and 5. If a resistance, such as the weight of the automobile is applied to the driven shaft 9, it will be held stationary and therefore gear 14 will be prevented from revolving. Thus the revolution of central gears 7 and 8 caused by their chain connections with bevel gears 4 and 5 will cause the rotation of intermediate pinions 12 around their axes 13 and also a revolution of these pinions around the gear 14. Therefore, the central gear 8 will revolve at a higher rate of speed than that of the central gear 7 and this will be taken care of properly by relative movement between bevel gears 4 and 5 and a consequent rotation of planet gear 2 around its posts 3 as well as a revolution of the planet gear around the driving shaft 1.

In order to cause forward movement of the driven shaft 9 the brake strap 16 may be tightened on the drum 15. If the strap is fully tightened revolution of central gear 8 is stopped and consequently the bevel gear 5 also ceases to revolve. Then the bevel gear 4 will be driven at twice the velocity of the driving shaft 1 through the rotation of planet gear 2 and central gear 7 will be revolved in the same direction because of the chain connection 6. Thus a rotation of intermediate pinions 12 around their axes 13 and a revolution of these pinions around the driven shaft 9 will be caused and consequently the gear 14 and driven shaft 9 will be revolved in the same direction as is the driving shaft 1. If the brake strap 16 is only partly tightened the central gear 8 will not be entirely prevented from moving, but its slow movement will reduce the velocity of the driven shaft 9 and thus give a different velocity ratio between the driving and the driven shaft.

To reverse the movement of the vehicle the brake strap 18 is tightened on the brake drum 17 and when central gear 7 and bevel gear 4 are thereby brought to rest the connection from the driving to the driven shaft is made through planet gear 2, bevel gear 5 and central gear 8. The revolution of gear 8 in the same direction as the driving shaft 1 is reversed by the intermediate pinions 12 and thus the gear 14 and the driven shaft 9 are rotated oppositely to the driving shaft 1. Here also if the brake strap 18 is only partly tightened a partial movement of central gear 7 will be permitted and thus a different velocity ratio in the reverse direction will be permitted the driven shaft 9.

Now referring to Fig. 9 the same numerals are applied to the parts as far as possible and the similar parts need not be again described. In the construction shown in this figure one of the intermediate pinions 12 is not carried loose on its shaft 13 but is fast thereon and this shaft is also provided with a brake drum 19 and a brake strap 20. As this drum shown in diagram is mounted on the central gear 7 it will, of course, be understood that it will revolve with the gear.

In the construction shown in Fig. 9 a slow forward movement of the driven shaft 9 is given by tightening the brake strap 20 on the brake drum 19. Such tightening prevents rotation of the intermediate pinion 12 on its axis 13 and thus it must revolve around driven shaft 9 as if it were fast to the central gear 7. Thus it forms a positive locked connection between the internal teeth 11 of central gear 8 and the teeth of gear 14. Therefore, the entire system including the bevel gears 4 and 5, the central gears 7 and 8, revolves as a unit and the ratio of velocity between driving shaft 1 and driven shaft 9 depends on the relative sizes of bevel gears 4 and 5 as compared with central gears 7 and 8. In the construction shown in the drawings, bevel gears 4 and 5 are one-fourth the size of central gears 7 and 8 and therefore a one to four ratio of velocity is obtained. It will be seen that if the brake strap 20 is only partially tightened on the drum 19 a different gear ratio will be obtained.

Figure 4:
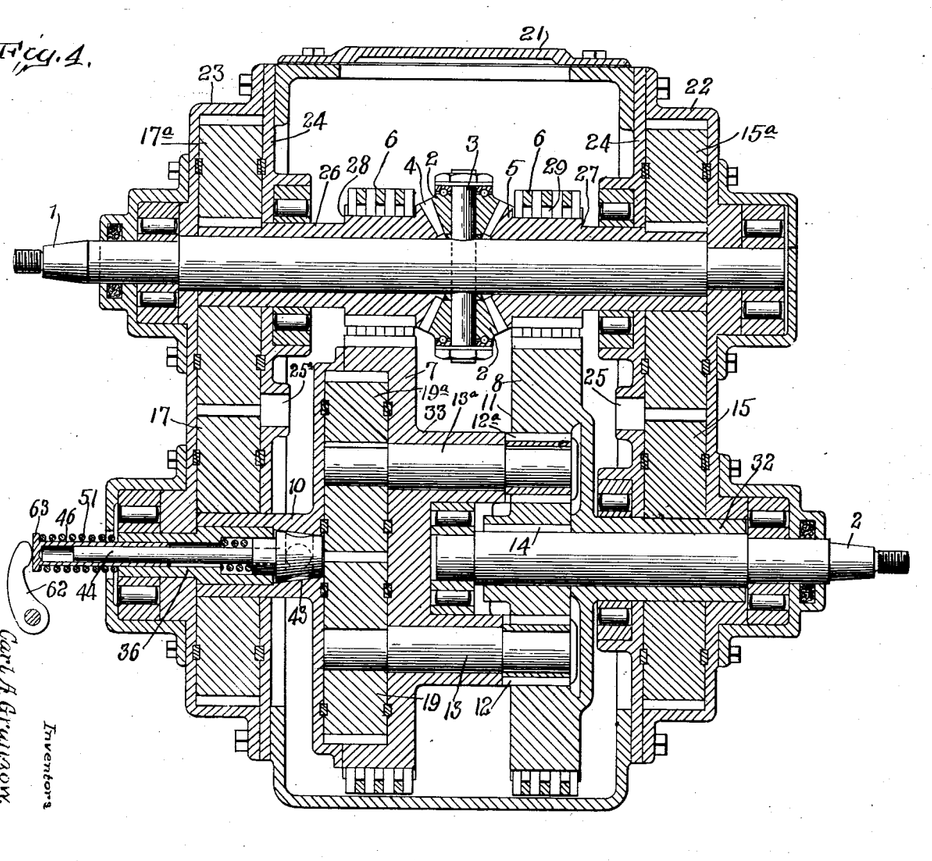
Fig. 4 is a vertical section through the center of the gear transmission proper showing the planetary gearing and the liquid pumps for restraining the movement thereof.

Referring now to the actual construction of the transmission gearing it will be seen that this is disclosed in Figs. 4 to 7, inclusive. Fig. 4 shows the driving shaft 1 which may be the crank shaft of an engine.

Figure 5:
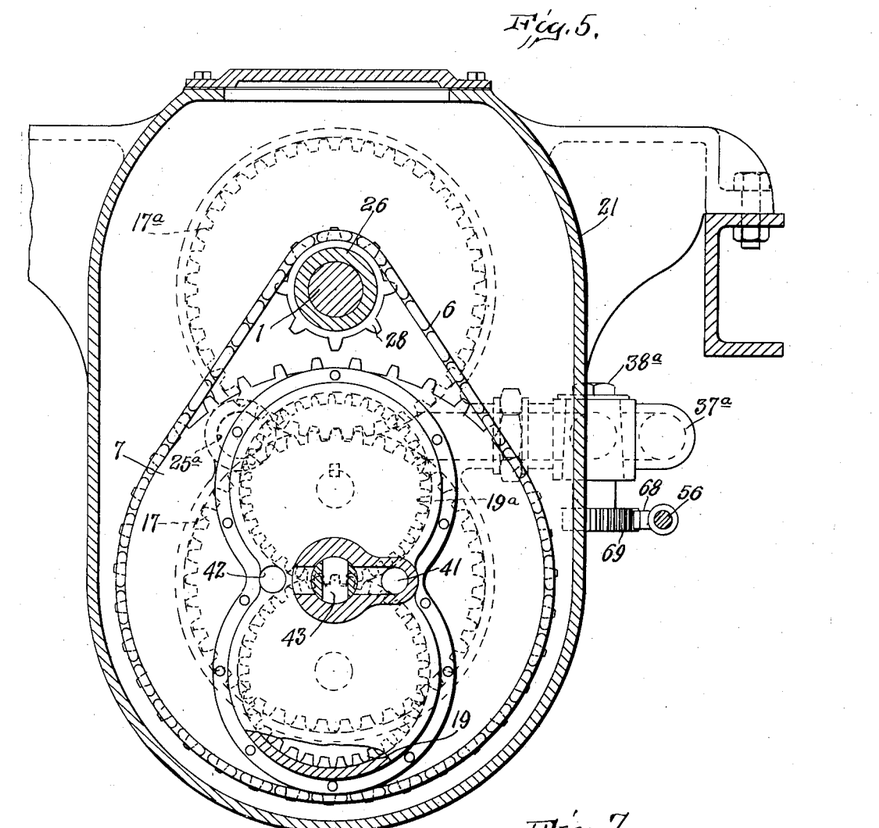
Fig. 5 is a vertical transverse section on the line 5—5 of Fig. 4.

A main casing 21 and two auxiliary casings 22 and 23 are provided, the sides 24 between the main and auxiliary casings being shown as common to the two. Casing 21 is intended to be completely filled with a liquid such as oil and there are orifices 25 in the sides 24 common to the main and auxiliary casings through which the liquid may pass. The driving shaft 1 passes completely through these casings and may have roller bearings, as shown. Fast to the shaft near the center thereof is the post 3 carrying at its opposite ends the planet gears 2. These gears mesh continually with the bevel gears 4 and 5 which are formed integrally with sleeves 26 and 27 journaled loosely on the driving shaft. These sleeves pass respectively through the auxiliary casings 23 and 22 and roller bearings as shown may be provided at any desired points. Portions of these sleeves 26 and 27 are provided with spur gears 28 and 29 and chains 6 pass over these spur gears and also over large central gears 7 and 8. As shown in Figs. 5 and 6, the central gears 7 and 8 have a ratio of sizes four to one as compared with spur gears 28 and 29. Therefore, the central gears 7 and 8 rotate in the same direction as spur gears 28 and 29 and at one-fourth the angular velocity.

The driven shaft 2 passes through the auxiliary casing 22 and the side 24 and surrounding this shaft is a loose sleeve 32 which is shown as integral with the central gear 8. Keyed fast to the driven shaft 2 is a gear 14 connected with internal teeth 11 on the central gear 8 by intermediate pinions 12 and 12ª. The central gear 7 is provided with bosses 33 surrounding shafts 13, 13ª, pinion 12ª being keyed to shaft 13ª. Also central gear 7 is provided with an axle extension 10 passing through the side 24 of the main casing and through the auxiliary casing 21. A sleeve 36 is carried inside the extension 10 and rotates therewith. This sleeve extends through an extension of the auxiliary casing 23 and may be provided, as shown, with roller bearings.

In each of the auxiliary casings 22 and 23 are a pair of gears constituting a liquid pump. In the casing 22 the gear 15 is loose on the sleeve 32 which is integral with the central gear 8 and this gear 15 meshes with a similar gear 15ª which is keyed on the sleeve 27. As shown the teeth of gears 15 and 15ª fit closely the side of the casing 22, a similar construction being shown in Fig. 5. Fig. 5 shows a pair of gears carried bodily by the central gear 7, but it will be understood that the construction is the same as that of gears 15 and 15ª just referred to. Similarly to the construction shown in Fig. 5 an orifice 25 passes through the side 24 of the casings so as to permit the passage of liquid out of the main casing into the auxiliary casing 22. A pipe 37, Figs. 1 and 6, passes from one side of casing 21 to auxiliary casing 22 and at any desired point is provided with a valve 38 controlling the passage of the liquid. The rotation of gears 15 and 15ª forces liquid through the pipe 37 past valve 38 and into the casing 21. The pressure thus produced in main casing 21 forces liquid through the orifice 25 and into casing 22, and gears 15 and 15ª then carry such liquid around with them and out of casing 22 through pipe 37. Wholly or partially closing valve 38 causes a resistance to the flow of liquid, thereby wholly or partially preventing rotation of gears 15 and 15ª.

A similar pair of pump gears 17, 17ª is employed in casing 23, gear 17ª being keyed to sleeve 26 and gear 17 being loose on the extension 10 of central gear 7. A pipe 37ª, Figs. 1 and 5, leads from main casing 21 to casing 23 and is provided with a valve 38ª. Rotation of gears 17, 17ª forces liquid through pipe 37ª past valve 38ª and into the main casing, from which it returns to auxiliary casing 23 through orifice 25ª. Wholly or partially closing valve 38ª has the effect of wholly or partially stopping rotation of gear 17, 17ª, and therefore of the sleeve 26 and central gear 7.

It will be seen that the construction thus far described corresponds generally to the diagrammatic construction of Fig. 8. Thus it would provide means for causing forward or reverse movement of driven shaft 2 as compared with the movement of the driving shaft 1. Assuming that both valves 38 and 38ª are entirely open so as to cause no resistance to the passage of the liquid through pipes 37, 37ª it will be seen that no resistance to the driven mechanism, such as an automobile, will compel the driven shaft 2 and consequently the gear 14 to remain stationary. Rotation of driving shaft 1 will cause rotation of the sleeves 26 and 27 and will consequently drive the central gears 7 and 8. Movement of these gears will be in the same direction but the gear 8 will turn faster than the gear 7. In the construction shown the ratios of the numbers of teeth on intermediate pinions 12 and 12ª, gears 14 and internal teeth 11 of central gear 8 is as one to two to four. That is, gear 14 is of twice the size of pinion 12 and internal gear 11 has twice as many teeth as gear 14. With this ratio and a ratio of one to four between the number of teeth in bevel gear 5 and the external teeth of central gear 8 the number of revolutions of gear 8 as compared with gear 7 will be in the ratio of three to two. Thus, the sleeve 27 will rotate at a higher velocity than the driving shaft 1 and the sleeve 26 at a slower velocity.

In case the valve 38ª is closed so as to prevent passage of liquid through the pipe 37ª the pump gears 17 and 17ª will then be prevented from revolving. This will prevent the central gear 7 from revolving and the sleeve 26 will be held stationary. Then the rotation of driving shaft 1 will cause rotation of sleeve 27 at twice the angular velocity and as central gear 8 is of four times the size of spur gear 29 it will revolve at one-half the angular velocity of driving shaft 1. The intermediate pinion 12 being prevented from revolution will act simply as a reversing gear and cause movement of gear 14 in a direction opposite to that of the central gear 8 and at twice the angular velocity thereof. Thus the ratio between the angular movement of driving shaft 1 and of driven shaft 2 is as one to one or they revolve at equal speeds. If instead of entirely closing valve 38ª the valve is only partly closed then a slow movement of gears 17 and 17ª will be permitted and also the driven shaft 2 will still move in a direction reverse to that of driving shaft 1. Its ratio of velocity will depend on the movement of gear 7 and therefore the driven mechanism may be started slowly and easily and finally brought up to an equality of speed with the driving shaft 1.

If valve 38 is entirely closed then movement of gears 15 and 15ª is prevented and therefore the central gear 8 and the sleeve 27 are prevented from revolving. In this case sleeve 26 would be driven at twice the speed of driving shaft 1 and therefore the central gear 7 will be moved at one-half the angular velocity of the driving shaft. Thus the intermediate pinions 12 will be rotated on their own axes and will revolve around the driven shaft 2, the result being that the shaft 2 is driven at one and a half times the speed of shaft 1 with the gear ratios shown in Fig. 6. This follows from the fact that the intermediate pinions 12 are revolved around shaft 2 at half the angular velocity of driving shaft 1. These pinions being half the size of the gear 14 are therefore given two rotations around their own shafts 13 for each revolution of gear 7 around driven shaft 2. These two rotations together with the one revolution cause three revolutions of the gear 14 and thus produce a speed ratio between the gear 14 and the driving shaft 1 of one and one-half to one as before stated. Here also if the valve 38 is not entirely closed a partial movement of central gear 8 will be permitted and thus the driven shaft 2 may be brought gradually up to speed by a variable closing of the valve 38. If the valve is nearly open only a slow movement of driven shaft 2 will be obtained.

The statements just made assumed as did the diagram of Fig. 8 that gears 12 were simply carried loose on their shafts 13. However, the actual construction employed is that one of these gears is fast on its shaft and the shafts carry pump gears 19 and 19ª in a cut-away portion in central gear 7. As shown in Fig. 5 these gears fit closely against the cut-away portion of the central gear and they are provided with orifices 41 and 42 from which oil may pass to and from the main casing 21. A valve 43 controls the passage of the oil and in Fig. 5 it is shown as being entirely closed. It will be understood that the entire pump mechanism including gears 19 and 19ª and the controlling valves therefor rotate with the central gear 7 and so a different mechanism for resisting the passage of liquid is necessary. The means shown comprises a valve stem 44 positioned in axial line of the central gear and carried by the sleeve 36. Thus the valve stem may rotate readily with the central gear 7. To turn the valve stem to permit or prevent passage of the liquid the stem is surrounded by a sleeve 46 having a slot 47 in which rides a pin 48 carried by the sleeve 36. An angle slot 49 in the sleeve 46 carries a pin 50 fast in the valve stem 44. As shown in Fig. 4 a spring 51 tends constantly to move the sleeve 46 to the left and thus maintains the valve stem 44 in position of Fig. 7. Movement of sleeve 46 to the right in Figs. 4 and 7 causes through the angle slot 49 a relative rotation of valve stem 44 inside sleeve 36 and therefore the valve stem may close the liquid passage entirely irrespective of whether central gear 7 is rotating or not. That is, the valve stem 43 rotates ordinarily at the same velocity as the gear 7, but it may be moved slightly ahead of the gear by movement of sleeve 46 to the right, and as long as the sleeve is retained in its right hand position the valve 43 will remain closed.

Assuming that the valve 43 is open and therefore that there is no resistance to the passage of liquid out of the casing inclosing gears 19 and 19ª the parts will operate as shown in diagram of Fig. 9. If both the gear pumps including gears 15 and 15ª and 19 and 19ª are permitted to move freely the mechanism will idle. If then the valve 43 is entirely closed rotation of intermediate pinions 12 on their axes will be prevented and thus the pinions act merely to connect the internal teeth 11 of central gear 8 with the gear 14. As the ratio of size of central gear 7 to bevel gear 4 is four to one this causes a reduction in speed of driven shaft 2 to one-fourth that of driving shaft 1. Also if the valve 43 is only partly closed a still greater reduction of speed may be obtained and the driven shaft 2 may be brought very slowly and gradually up to the ratio just mentioned, namely, one to four.

It will be seen that for many uses the gear pumps 19 and 19ª would not be required, but they serve to permit a more gradual increase of the speed ratio up to the high gear ratio obtained by the use of gears 15, 15ª.

Figures 1, 2:
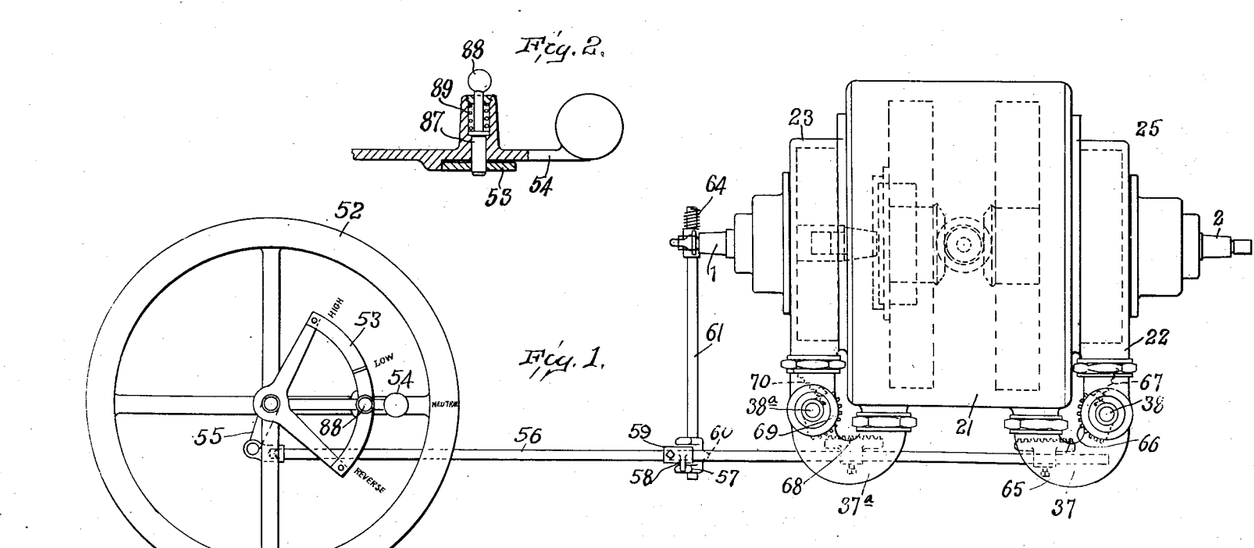
Figure 1 is a general view, somewhat diagrammatic, of the system as a whole showing its application to an automobile.
Fig. 2 is a detail of the controlling lever for determining the velocity ratio.
Figure 3:
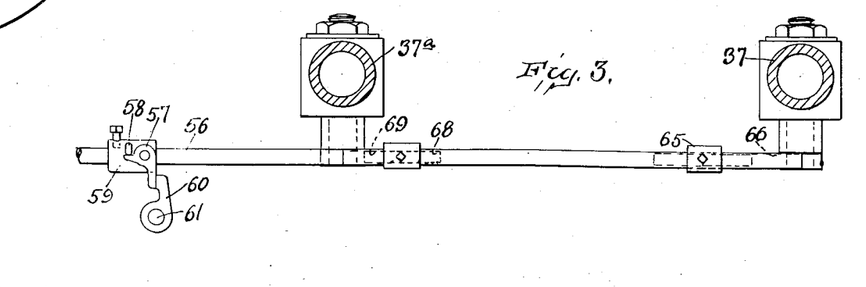
Fig. 3 is a detail of the parts shown in Fig. 1 and by which the control of the velocity ratio is attained.

Any desired method of controlling the valves which themselves determine the passage of liquid may be employed, depending on the use to which the transmission gearing is to be put. As an illustration there is shown a controlling mechanism adapted to be employed with an automobile. Referring to Fig. 1 the ordinary steering wheel 52 of an automobile is provided with the usual sector 53 over which the spark and throttle levers pass. An additional lever 54 is journaled on the steering post adjacent the sector 53 and is shown in Fig. 1 in its normal neutral position. As indicated by the words adjacent the sector the lever 54 is moved in one direction to produce the low and high speed forward movement of the driven mechanism and in the other direction to produce the reverse movement. The lever 54 is fast to an arm 55 connected to a long link 56. This link is provided with means for controlling the three valve devices for the gear pumps. To control the slow speed forward movement the link 56 carries a by-pass pawl 57 adapted to engage a pin 58. This pawl 57 is pivoted on a projection 59 adjustably mounted on the link 56 and the pawl is adapted to engage a crank arm 60 carried rigidly on a shaft 61. At its other end the shaft 61 is provided, as best shown in Fig. 4, with an arm 62 adapted to engage the head 63 of sleeve 46 so as to move it longitudinally and a spring 64 is provided to return the shaft 61 to its normal position. It will be seen from Fig. 1 that only a slight movement of the lever 54 is required to move it to the low gear position and to permit further movement so that the high gear position may be reached is the function of the by-pass pawl 57. It will be seen that the continuing movement of the link 56 will cause the pawl 57 finally to pass entirely beyond the crank arm 60, whereupon the spring 64 may promptly restore the shaft 61 to normal position, thus permitting the sleeve 46 to move outwardly and thereby opening the valve 43. Further movement of link 56 causes a rack 65 carried thereby to engage a rack segment 66 which controls the valve 38. A spring 67 tends to restore the valve 38 to its open position. Thus the continued movement of link 66 serves to close valve 38 and thereby prevent the free movement of the gear pump 15, 15ª.

To cause the reverse movement the lever 54 is moved in the opposite direction from neutral position and then a rack 68 carried by the link 56 engages a rack segment 69 controlling the valve 38ª against the tension of a spring 70. Therefore movement of the link 56 to the left in Fig. 1 serves to close the valve 38ª and thereby prevent rotation of the gear pump 17, 17ª. When the lever 54 is returned to neutral position the spring 70 will again open the valve 38ª and permit the engine to idle again.

Fig. 2 shows a device which may be employed to determine the movement of control lever 54. As shown, this lever has a boss in which is mounted a pin 87 having a knob 88 and moved by a spring 89 into a hole in sector 53. This hole will be placed at "neutral" position and the construction prevents accidental movement of lever 54 from or through neutral position.

The construction in Fig. 4 shows gear 19ª and pinion 12ª keyed to shaft 13ª while pinion 12 is loose on shaft 13 and gear 19 may be either tight or loose on this shaft. Thus the actual driving is through pinion 12ª but pinion 12 produces a smoother motion than if only pinion 12ª was employed.

In Fig. 4 the gears 15ª and 17ª are shown as keyed on sleeves 27 and 26 while gears 15 and 17 are loosely carried. The diagrams, Figs. 8 and 9, show an opposite relation and obviously either form may be employed. The form of Fig. 4 produces a greater drag, with a given partial valve opening, than the form of Figs. 8 and 9 because the velocity of the sleeves 26 and 27 is higher than that of the central gears 7 and 8.

The gear ratios produced by the invention depend on the relative sizes of the gears. One set of ratio has been disclosed but any desired ratios may be provided by properly proportioning the sizes of the gears. As indicated by Figs. 8 and 9 the invention may be employed without the inclusion of the low gear or without the reverse gearing. Whether these shall be employed in any particular case will depend on the use to be made of the transmission gearing. In the case of an automobile both will be employed, the low gear construction being, as usual, employed in starting the car or in hill climbing.

It is to be noted that the retardation of the gear pumps by closing the valves, does not involve any loss of power. There is no frictional resistance, such as would occur with a friction device of any type. Also it is obvious that in place of a liquid, the invention may employ a gas, such as air, and claims reciting the use of liquid are intended to cover such use of a gas.

The control shown in Fig. 1 is, of course, illustrative only as other means may be employed, and such means may be operated by the foot instead of the hand, for example. The inclusion in the claims of the term "hand operated" is therefore to be understood to cover any form of optionally operable device under the control of the operator.

Having thus fully described our invention, what we claim as new and desire to secure by Letters Patent, is:—

1. In a transmission mechanism, the combination, with a driving shaft and a driven shaft, and connections between said shafts including a plurality of sets of planetary gearing coöperating respectively with said shafts, of devices for preventing or permitting movement of an element of said planetary gearing, said devices comprising a gear pump for liquid and means for varying the resistance of the liquid to said gear pump.

2. In a transmission mechanism, the combination, with a driving shaft and a driven shaft and planetary gearing connecting said shafts, including a planet gear carried by said driving shaft and planet gearing and a central gear driven from the drive shaft, of a gear pump for liquid having means for varying the resistance of the liquid to said gear pump, and connections from said gear pump to said central gear.

3. In a transmission mechanism, the combination, with a driving shaft and a driven shaft and planetary gearing connecting said shafts, including a planet gear carried by said driving shaft, and a planet gear and a central gear connected to said driven shaft, a gear pump for liquid moving with said central gear, and a hand operated valve for varying the resistance of the liquid to said gear pump.

4. In a transmission mechanism, the combination, with a driving shaft and a driven shaft, and planetary gearing connecting said shafts including a planet gear carried by said driving shaft and a planet gear and a central gear connected to said driven shaft and driven from said planet gear, a gear pump for liquid moving with said central gear, and a hand operated valve for varying the resistance of the liquid to said gear pump.

5. In a transmission mechanism, the combination, with a driving shaft and a driven shaft and planetary gearing connecting said shafts including a planet gear carried by said driving shaft and a central gear loose on said driven shaft and having connections to said driven shaft, a pump for liquid driven with said central gear, and a valve for varying the resistance of the liquid to said pump.

6. In a transmission mechanism, the combination, with a driving shaft and a driven shaft, of a planet gear carried by said driving shaft, a central gear loose on said driven shaft but having connections to drive said driven shaft, a pump for liquid comprising meshing gears driven with said central gear and a casing closely fitting said gears, and a valve for varying the resistance of the liquid to said gears.

7. In a transmission mechanism, the combination, with a driving shaft and a driven shaft, of a planet gear carried by said driving shaft, a central gear having connections to said planet gear and to the driven shaft, said connections including a gear fast to said driven shaft and an intermediate pinion connecting said driven shaft gear to said central gear, a pump for liquid driven with said central gear, and a valve for varying the resistance of the liquid to said pump.

8. In a transmission mechanism, the combination, with a driving shaft and a driven shaft, of a planet gear carried by said driving shaft, central gears having connections to opposite sides of said planet gear, means for separately preventing or permitting movement of said central gears, an intermediate pinion carried by one of said central gears and meshing with the other of said central gears, and devices whereby said intermediate pinion may actuate said driven shaft.

9. In a transmission mechanism, the combination, with a driving shaft and a driven shaft, of a planet gear carried by said driving shaft, central gears having connections to opposite sides of said planet gear, pumps for liquid separately moved with said central gears, means for separately varying the resistance of the liquid to said pumps, an intermediate pinion carried by one of said central gears and meshing with the other of said central gears, and a gear fast to said driven shaft and also meshing with said intermediate pinion.

10. In a transmission mechanism, the combination, with a driving shaft and a driven shaft, of a planet gear carried by said driving shaft, central gears having connections to opposite sides of said planet gear, means for separately permitting or preventing movement of said central gears by said planet gear, an intermediate planet pinion carried by one of said central gears and meshing with the other of said gears, and means connecting said intermediate pinion to said driven shaft.

11. In a transmission mechanism, the combination, with a driving shaft and a driven shaft, of a planet gear carried by said driving shaft, two central gears respectively having connections to opposite sides of said planet gear, the connections including gears meshing with said planet gear, one of said central gears being loosely carried by the driven shaft, pumps for liquid driven respectively with said central gears, means for separately varying the resistance of the liquid to said pumps, a gear fast to the driven shaft, an intermediate pinion meshing with the driven shaft gear and the central gear loose on the driven shaft, and a shaft carried by the other of said central gears and on which said intermediate pinion rotates.

12. In a transmission mechanism, the combination, with a driving and a driven shaft, and a planet gear carried by said driving shaft, of two central gears connected respectively to opposite sides of said planet gear, connections between one of said central gears and said driven shaft, said connections including a pinion mounted on the other of said central gears, and means for separately preventing or permitting the revolution of said central gears.

13. In a transmission mechanism, the combination, with a driving and a driven shaft and a planet gear carried by said driving shaft, of two central gears connected respectively to the opposite sides of said planet gear, connections between one of said central gears and the driven shaft, said connections including a pinion mounted on the other of said central gears, and pumps for liquid connected to said central gears, with means for separately varying the resistance of the liquid to said pumps.

14. In a transmission mechanism, the combination, with a main casing and an auxiliary casing, of transmission gearing in said main casing, gears constituting a liquid pump in said auxiliary casing, connections whereby said transmission gearing drives said pump gears, said casings abutting each other and having liquid orifices in the abutting portions, and means for varying the resistance of the liquid passing from one casing to the other.

15. In a transmission mechanism, the combination, with a main casing and an auxiliary casing, said casings having one side common to both, with a liquid orifice in said common side, of transmission gearing mounted in said main casing, gears constituting a liquid pump carried in said auxiliary casing, connections whereby said transmission gearing may drive said pump gears and thereby force liquid from said auxiliary casing into said main casing, and a valve for controlling the passage of liquid from one casing to the other.

16. In a transmission mechanism, the combination, with a main casing and an auxiliary casing, said casings having one side common to both, with a liquid orifice in said common side, transmission gearing in said main casing including: a planet gear, two central gears having connections respectively to opposite sides of said gear, a pinion carried by one of said central gears and connected to the other of said gears, and a shaft driven from said pinion; of gears constituting a liquid pump, said gears being mounted in said auxiliary casing and having connections to said other central gear, with a valve mounted on said main casing and controlling the passage of liquid through said orifice from the main casing to the auxiliary casing.

17. In a transmission mechanism, the combination, with a main casing and auxiliary casings on opposite sides thereof, each auxiliary casing having one side common to it and the main casing, transmission gearing in said main casing including a planet gear and two central gears having connections respectively to opposite sides of said planet gear, gears constituting a liquid pump in each of said auxiliary casings, connections from each gear pump to one of the central gears, means for varying the resistance of the liquid to said pumps, and a shaft connected to be driven from one of said central gears, the connection including a pinion carried by the other of said central gears.

18. In a transmission mechanism, the combination, with a driving shaft and a planet gear carried thereby, of two central gears having connections respectively to opposite sides of said planet gear, a driven shaft, connections from said driven shaft to one of said central gears, said connections including a pinion mounted on the other of said central gears, means for preventing or permitting revolution of said one of said central gears, and devices carried by said other central gear for preventing or permitting rotation of said pinion relative to said other central gear on which the pinion is mounted.

19. In a transmission mechanism, the combination, with a driving shaft and a planet gear carried thereby, of two central gears having connections respectively to opposite sides of said planet gear, a driven shaft, connections from said driven shaft to one of said central gears, said connections including a pinion mounted on the other of said central gears, a pump for liquid driven by said one central gear, with means for varying the resistance of the liquid to the pump, a second pump for liquid carried by said other central gear and driven by rotation of said pinion relative to said gear, and means for varying the resistance of the liquid to said second pump, said varying means including a valve carried axially of said other central gear.

20. In a transmission mechanism, the combination, with a transmission gear, and means for revolving it, of two meshing gears constituting a liquid pump, said pump gears being bodily carried by said transmission gear and having their teeth meeting in the axial center of said transmission gear, a pinion fast to one of said pump gears and means for varying the resistance of the liquid to said pump gears.

21. In a transmission mechanism, the combination, with a transmission gear and means for revolving it, of two meshing gears constituting a liquid pump, said pump gears being bodily carried by said transmission gear, and having their teeth meeting in the axial center of said transmission gear, a pinion fast to one of said pump gears, a valve controlling passage of liquid from said pump gears, said valve being carried axially of said transmission gear and a sleeve also carried axially of said transmission gear and revolving therewith, and having an angle slot whereby axial movement of said sleeve may revolve said valve relative to said transmission gear.

22. In a transmission mechanism, the combination, with a transmission gearing, and a driving shaft and a driven shaft connected by said gearing, of pumps for liquid constructed to control the connection of said driving and said driven shafts to said transmission gearing, a hand lever movable to different extents from a neutral position, and connections whereby said hand lever may control separately the resistance of the liquid to said pumps.

23. In a transmission mechanism, the combination, with a transmission gearing, and a driving and a driven shaft connected by said gearing, said gearing including two central gears, pumps for liquid connected respectively to said central gears, means for separately varying the resistance of the liquid to said pumps, a hand lever movable to different points from a neutral position, and connections from said hand lever to control separately the resistance of the liquid to said pumps.

In testimony whereof, we affix our signatures.

CARL A. GRANZOW.
HENRY M. GRANZOW.